H. H. STEELE.
CHECK WRITER.
APPLICATION FILED APR. 11, 1919.

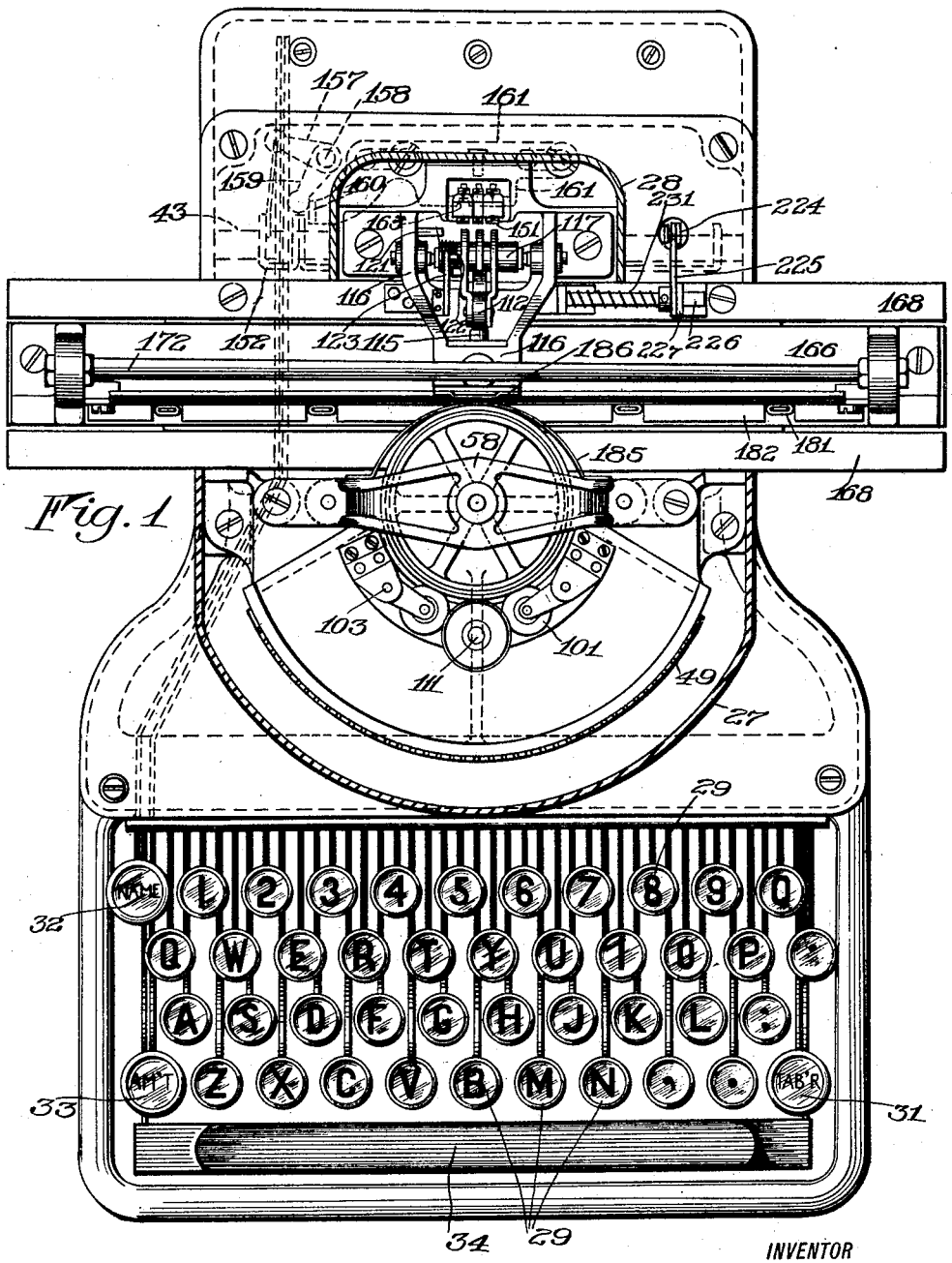

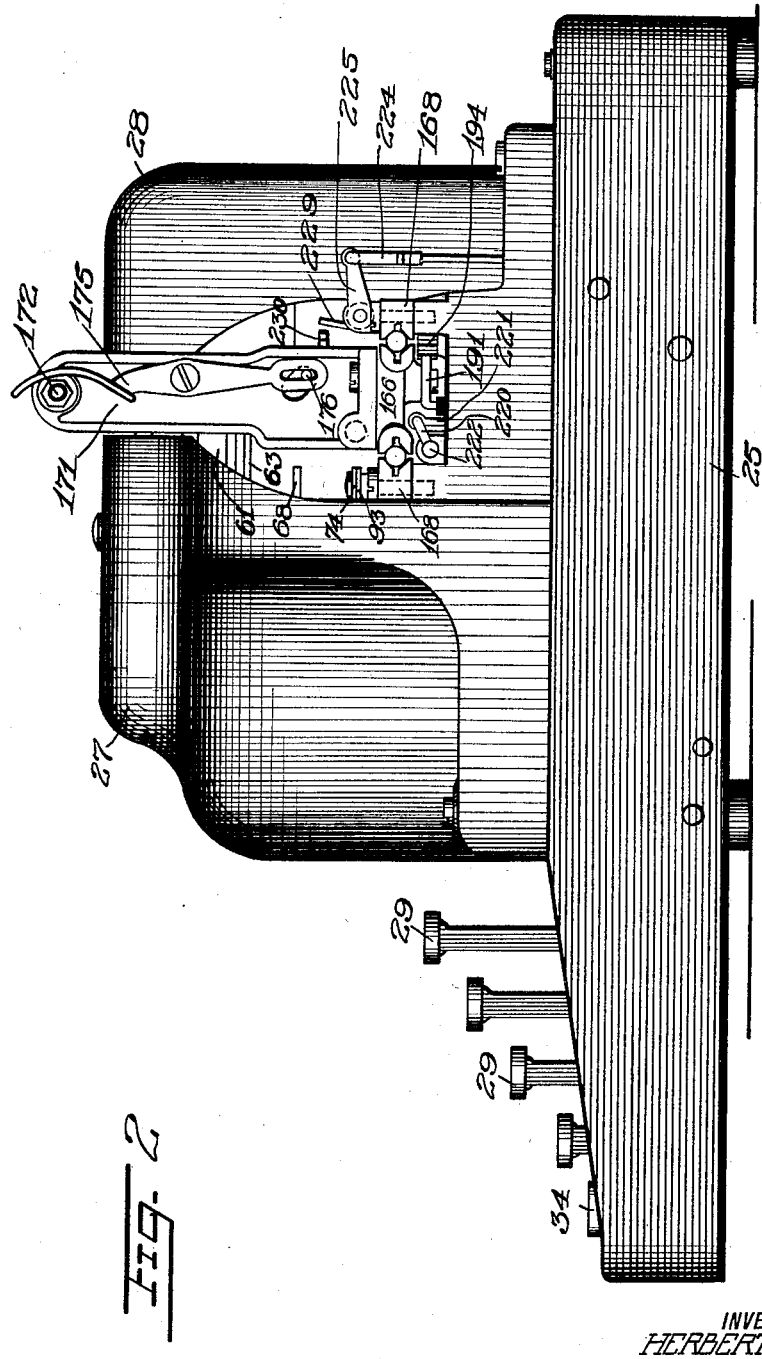

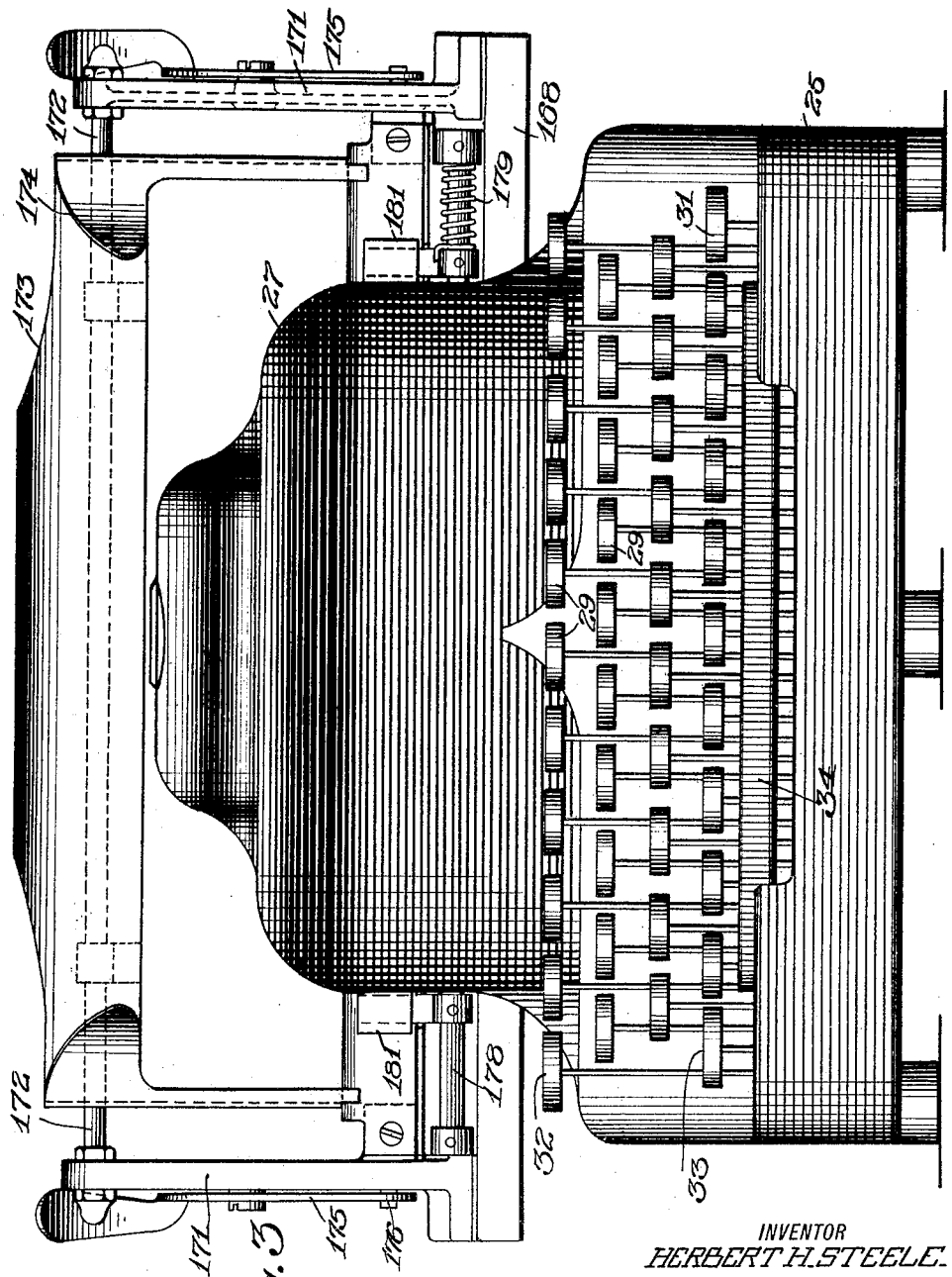

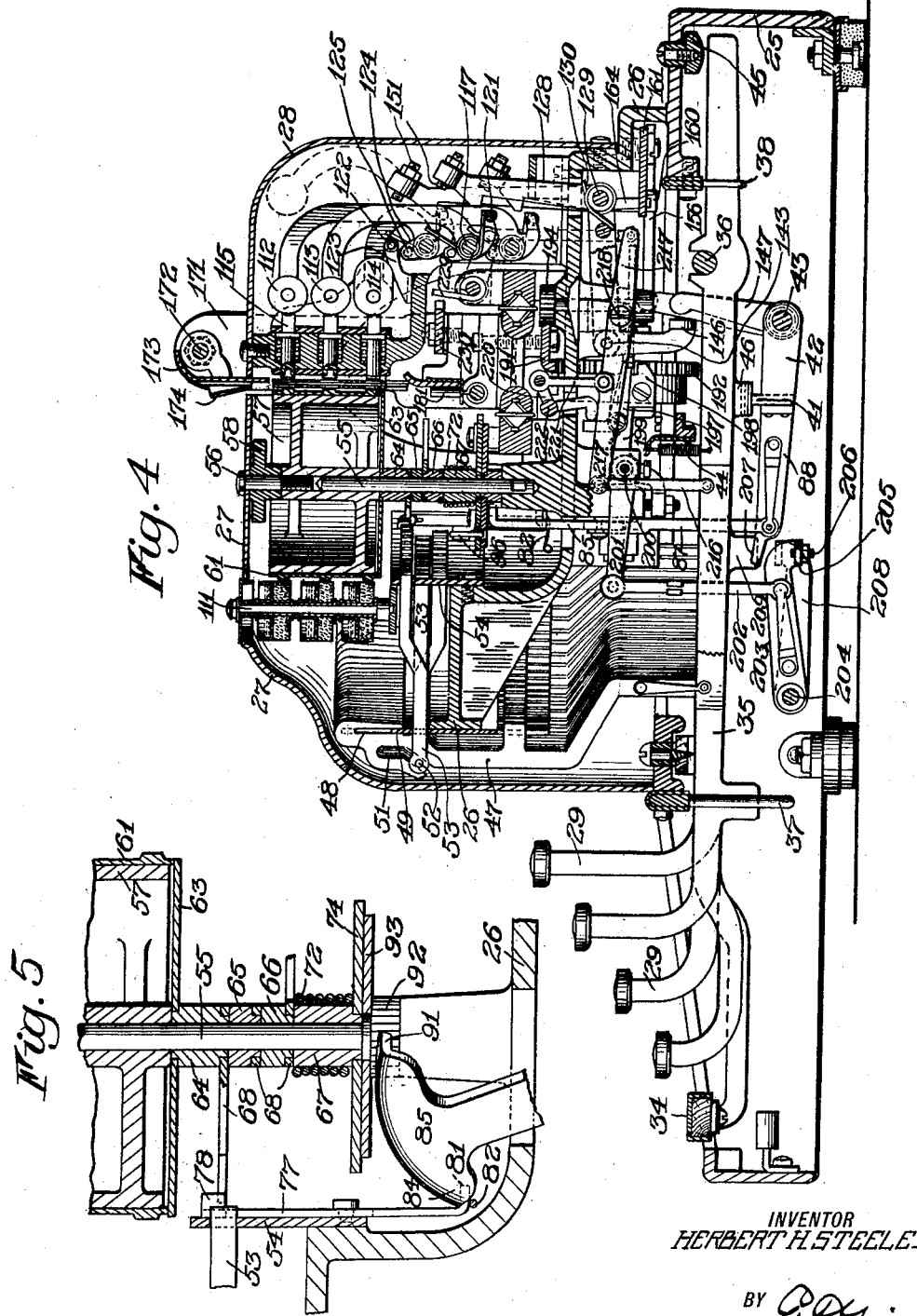

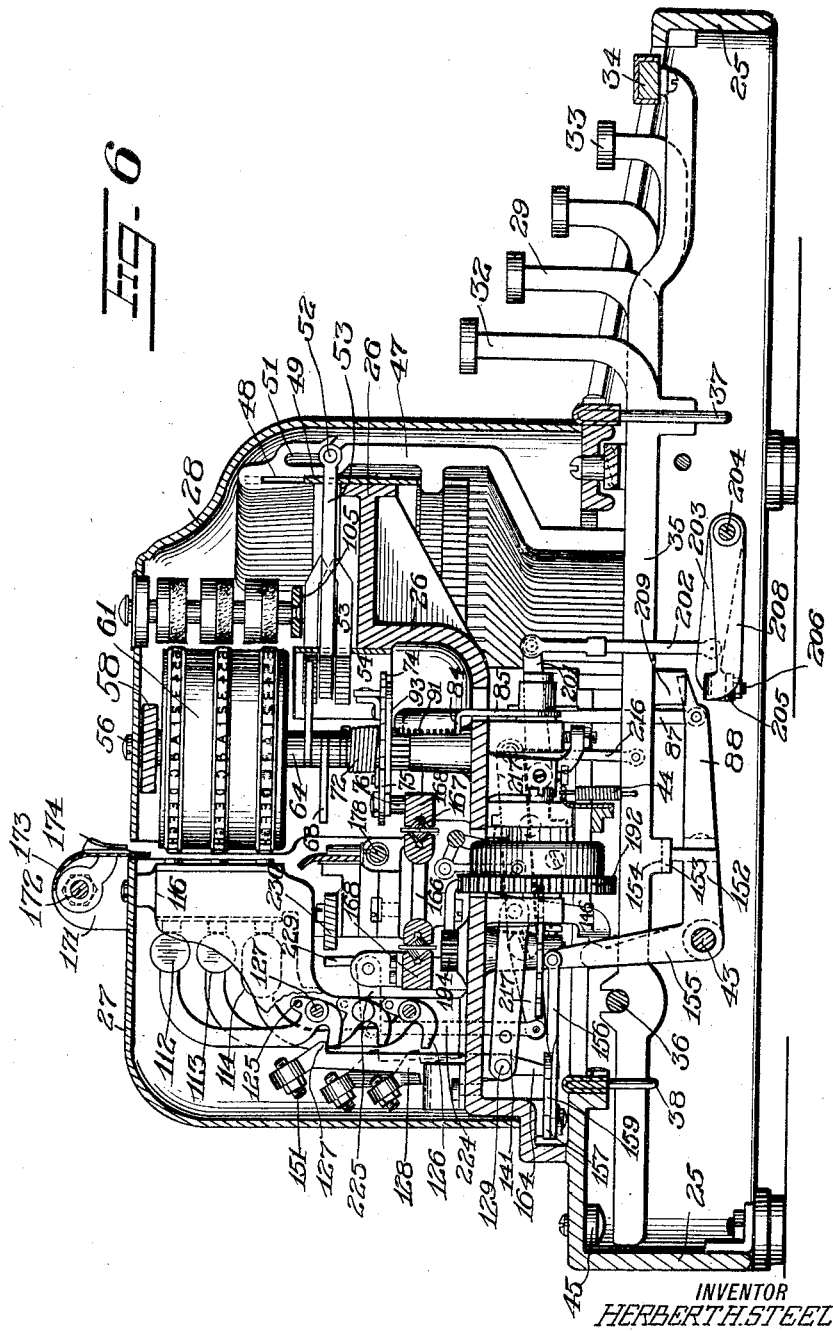

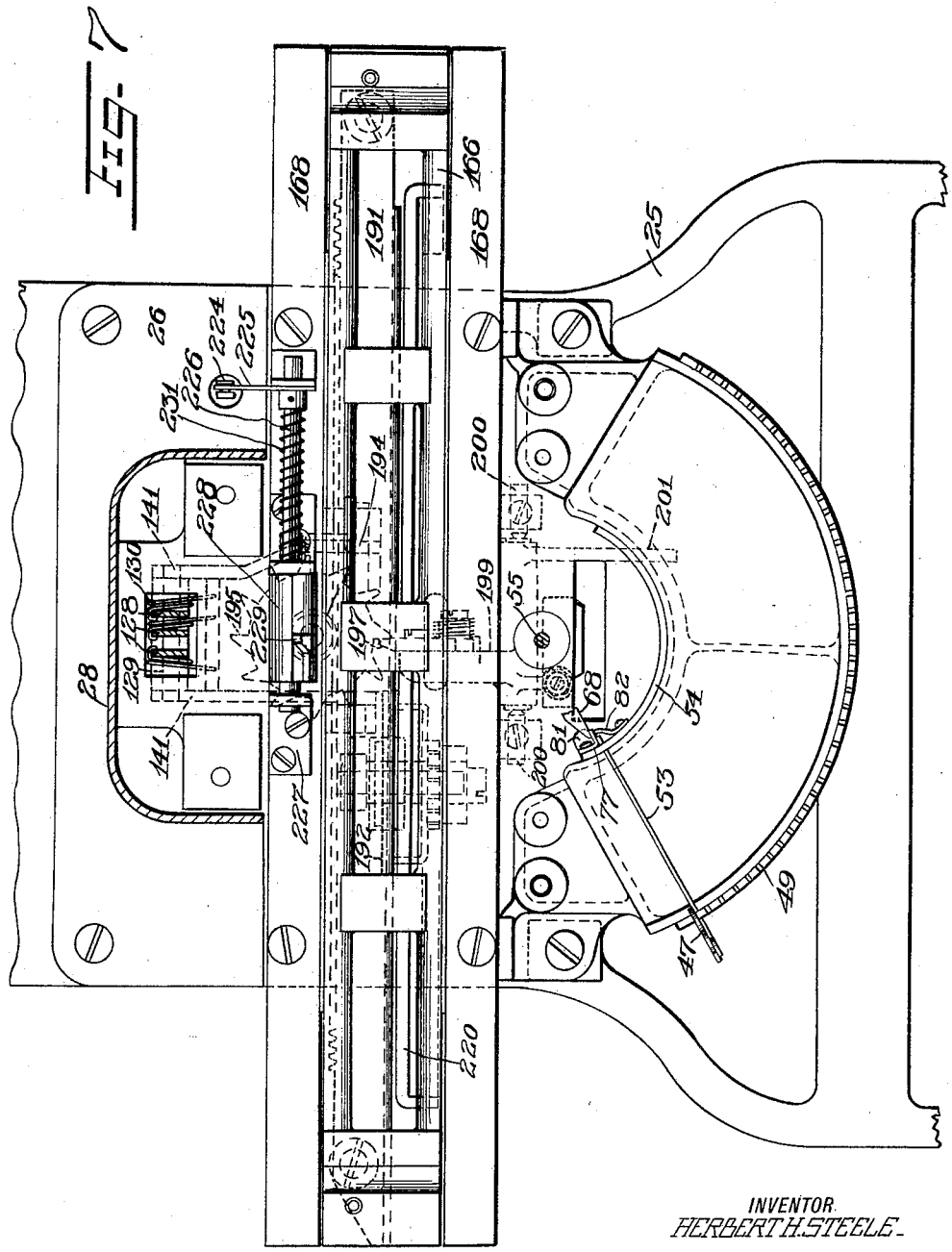

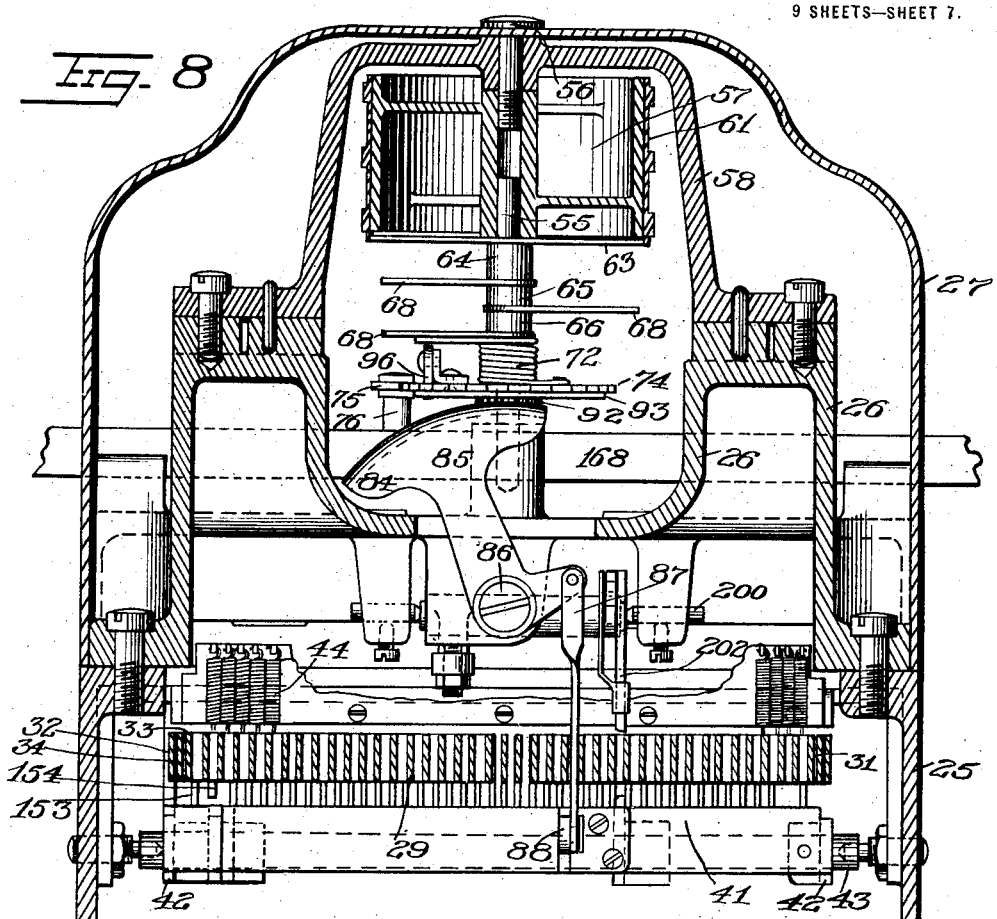

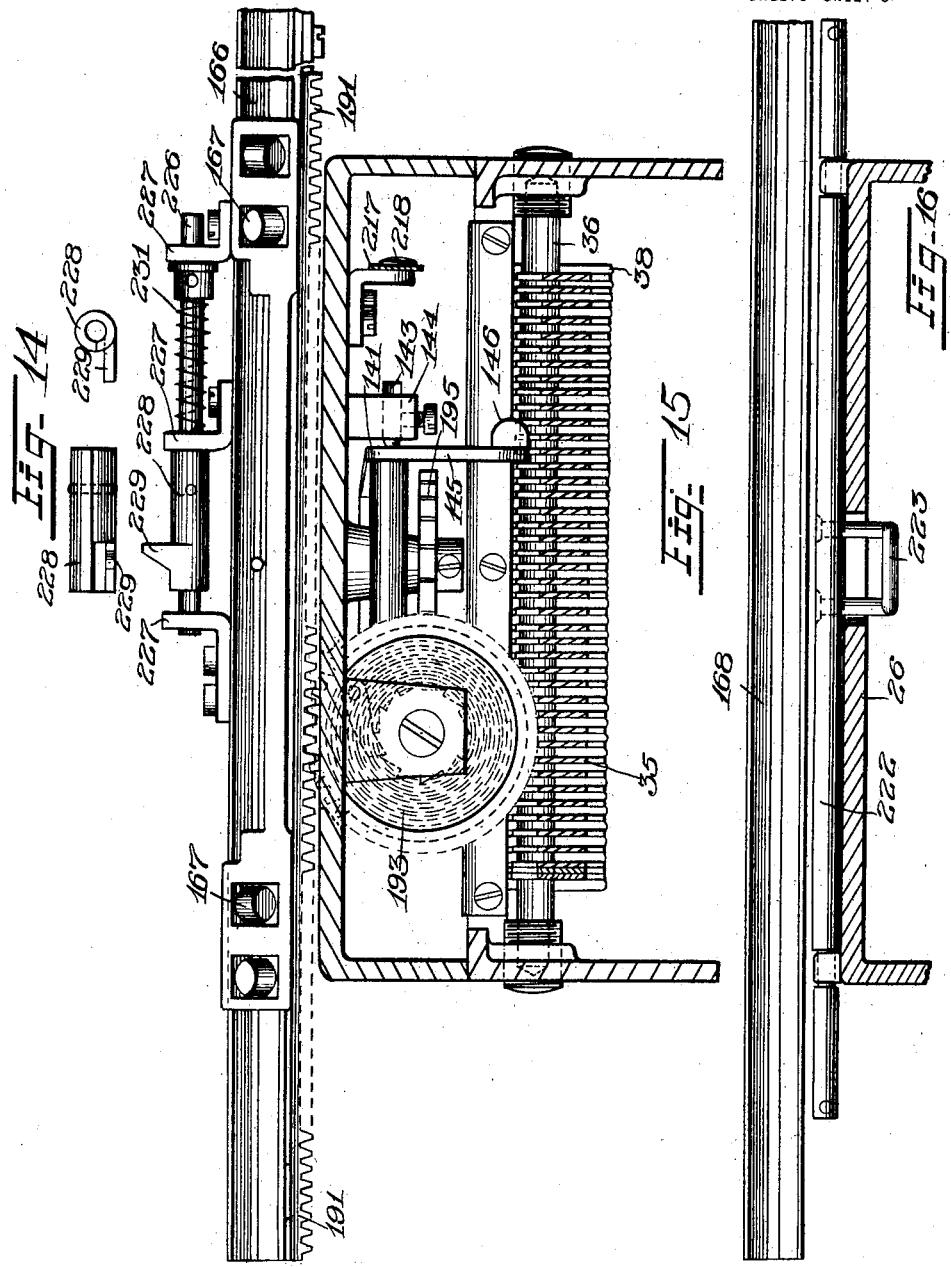

1,400,574.

Patented Dec. 20, 1921.

INVENTOR
HERBERT H. STEELE.

BY
ATTORNEY

UNITED STATES PATENT OFFICE.

HERBERT H. STEELE, OF PITTSFORD, NEW YORK, ASSIGNOR TO TODD PROTECTOGRAPH COMPANY, INC., OF ROCHESTER, NEW YORK, A CORPORATION OF NEW YORK.

CHECK-WRITER.

1,400,574.

Specification of Letters Patent.   Patented Dec. 20, 1921.

Application filed April 11, 1919.   Serial No. 289,389.

*To all whom it may concern:*

Be it known that I, HERBERT H. STEELE, a citizen of the United States of America, and a resident of Pittsford, in the county of Monroe and State of New York, have invented certain new and useful Improvements in Check-Writers; and I hereby declare the following to be a full, clear, and exact description of the same.

This invention relates to printing machines and has particular reference to devices of the kind adapted for printing inscriptions on checks, drafts and other commercial forms.

While, as will be more clearly apparent later, the illustrative machine shown in the accompanying drawings and hereinafter described is capable of other uses, a broad object of the invention is to provide a machine which can be used conveniently to fill in all of the variable matter such as the date, name of the payee and amount upon blank checks or other commercial forms and in correct relation with the invariable matter printed on such forms.

Another object is to provide an improved mechanism for setting a type carrier to print the matter desired.

Still another object is to provide a means whereby in a machine having a plurality of independently operable impression members, any desired one of said impression members may be operated.

With these and other objects in view the invention consists in the novel arrangement and combination of parts of which the features of novelty are pointed out in appended claims and one form of embodiment of which is hereinafter described with reference to the accompanying drawings.

Of said drawings:

Figure 1 is a top plan view of the illustrative machine with part of the casing cut away to expose some of the mechanism to view and having other parts of the mechanism shown in dotted outline.

Fig. 2 is a right hand elevation and Fig. 3 is a front elevation of the complete machine.

Fig. 4 is a vertical section with some of the parts projecting from the plane on which the section is taken.

Fig. 5 is a detail of some of the mechanism for stopping and releasing the type carrier.

Fig. 6 is a vertical section taken near the left hand side of the machine.

Fig. 7 is a plan view of certain features of the paper carriage and escapement mechanism.

Fig. 8 is a partial transverse section looking toward the rear of the machine.

Fig. 9 is a detail illustrating the construction of the ink applying rollers.

Figs. 10, 11, 12 and 13 are details of parts of the mechanism for winding up the type carrier motor spring.

Fig. 14 shows different views of part of the tabulating mechanism.

Fig. 15 shows details of the paper carriage mechanism and certain features of the escapement and tabulating devices.

Fig. 16 shows the construction of the bail forming part of the mechanism for disabling the paper carriage escapement when the tabulator key is depressed.

Fig. 17 shows the construction of one of the parts immediately associated with the type carrier.

Fig. 18 shows, among other things, the construction of the printing hammers and some of the mechanism for selectively operating them.

Fig. 19 is a top plan view showing the radial relation of the arms for stopping the type carrier.

Fig. 20 is a vertical section through the paper carriage and illustrates particularly the paper gripping devices.

Fig. 21 is a detail in top plan of the ink reservoir and ink roll mechanism.

Described in a general way, the illustrative machine has a key board very much like the universal typewriter key board in general use with connections whereby depressions of keys will set stops for a type carrier. The type carrier is normally held against the tension of a spring but is released for rotation by the spring as an incident to depressing the keys. Before this release occurs, however, the stop associated with the operated key will have been moved far enough to interrupt the movement of the type carrier so that a character corresponding to the key will be set at the printing point. After the type carrier is set a percussion hammer operates through a plunger to take an impression from the type.

The type carrier has three circumferentially extending rows of type with a hammer for each row. These hammers act through impression plungers. Mechanism is provided for selectively operating these hammers according to the line of type to be printed from. The type lines are shown in the accompanying drawings as being spaced apart equal distances but the type carrier construction is such that this spacing can be varied according to the distance between the lines of the form on which the printing is to fall.

As before stated in a general way, the type carrier is normally latched against movement, but, when unlatched, it is driven by a spring until its movement is interrupted by a stop set by operation of a key. Mechanism is provided whereby the operation of the key to release the type carrier for operation also restores tension to the spring so that the spring will, at all times, be capable of moving the type carrier quickly from one position to another.

The machine also has mechanism which is herein usually referred to as tabulating mechanism for stopping the paper carriage in different positions according to where the printing of a line is to begin. The date is usually written in the upper right hand corner of the check, the name of the payee usually follows the words "Pay to the order of" or words of corresponding import and the amount falls on a line below the payee line and should begin as near as possible to the left hand margin of the check to afford the best protection. The tabulating mechanism is so constructed that the points where the date and payee lines are to begin may be determined by operating a tabulator key instead of being compelled to get the correct location by adjusting the paper in the machine or manually moving a carriage supporting the paper.

The type for printing the amount and the impression plunger coöperating therewith may be provided with complementary ridges and grooves to shred the paper in the manner fully shown and described in United States Letters Patent #793,249 issued June 27, 1905, to L. M. Todd. The impulse to the amount plunger is given by a hammer which is heavier than the hammers for either of the other two type lines. The hammers are, as before stated, selectively operable so that the heavy hammer for shredding the amount is only called into play when the amount is being written. It is obvious that the same shredding construction may be employed for writing in the date and payee's name, if desired.

Described in detail and with reference to the drawings, the machine has rectangular base casting 25. Secured to this base is a second frame 26, the central portion of which extends forward and upward and supports the larger part of the mechanism. A casing composed of two portions 27 and 28 incloses the mechanism, these two sections of the casing being separated to provide a slot in which a paper carriage operates.

By referring to Fig. 1, it will be seen that the machine has a key 29 for each letter of the alphabet and the ten ordinals as well as keys for certain punctuation marks. For convenience, these keys will usually be referred to hereinafter as the printing or writing keys. At the right hand side of the key board is a tabulator key 31 which may be operated to determine the starting point of the written line. At the left hand of the key board is a name key 32 and an amount key 33 and across the front of the machine is the usual spacing bar 34.

The writing keys 29 each comprises a bar 35 (Figs. 4 and 6) notched near its rear end to engage a fulcrum rod 36. The key bars 35 are guided at the front and back by combs 37 and 38. Extending across the machine below all of the keys except the keys 31, 32 and 33 is a universal bar 41 supported by side arms 42 secured to a shaft 43. Springs 44 serve to hold the keys in their normal positions and return them after they have been depressed. At their rear ends, the key bars coöperate with an adjustable fulcrum bar 45 in a manner well known in the art. Each of the key bars is provided with a lug 46 to engage the universal bar 41 when the key is depressed. These lugs are of different lengths corresponding to the varying lengths of the key bars so that regardless of the length of the key bar, the universal bar will be given the same extent of movement no matter which key is operated.

Pivotally connected to each of the printing keys near their forward ends is a cam member 47 provided at its upper end with a slot 48 engaging a guide 49 supported by the frame member 26. The upper ends of the cam members are also provided with cam slots 51 engaging studs 52 carried by stops 53 mounted for endwise movement in the guide 49 and a guide 54. The guides 49 and 54 are concentric and the stops 53 converge toward a central rod 55. The inner ends of the stops 53 are offset or formed to bring the rear ends in three different horizontal planes, the object being to make it possible to have the stops operate within a compartively limited space.

As so far described, it will be apparent that when one of the printing keys 29 is depressed, the corresponding cam member 47 will be drawn down and that the cam slot 51 will almost immediately thrust the corresponding stop 53 toward the rod 55. When the finger is removed from the key, the key spring 44 will return the key to its normal position and, during the latter part of this return movement, the stop 53 will be withdrawn to its first position.

Extending down through the top of the casing 27 and through a frame 58 (Figs. 4 and 8) is a screw 56 threaded to engage the hub of an anvil 57, the construction being such that the anvil is clamped to the frame 58. Loosely surrounding the anvil 57 is a type carrier 61 provided with notches (not shown) engaged by shoulders 62 (Fig. 17) on the periphery of a circular plate 63 integral with a hub 64 loose on the rod 55. Rigid with the hub 64 are hubs 65, 66 and 67. Rigid with each of the hubs 65, 66 and 67 is an arm 68, each arm being (as shown in Fig. 19) in a different horizontal plane and in alinement with one of the three rows in which the inner ends of the stops 53 are arranged. The lower arm 68 is provided with a hole 71 engaged by one end of a torsion spring 72. The other end of the spring engages a pin 73 (Fig. 13) attached to the upper face of a ratchet disk 74 normally held stationary by a spring pressed pawl 75 (Fig. 8) loose on a stud 76. The spring 72 is, at all times, under tension and tends to rotate the arms 68 and type carrier 61. This movement of the arms and type carrier is, however, normally prevented by a latch member 77 (Figs. 4 and 5) slidably mounted on the inside of the guide 54 and provided with a lug 78 normally engaged by the upper one of the three arms 68. The lower end of the slide 77 is provided with a lug 81 engaged by a light spring 82 tending at all times to raise the latch 77 to its upper position. The latch is, however, normally held in its lower position by the portion 84 (Fig. 6) of a segment 85 (Fig. 8) engaging the upper side of the lug 81 on the latch. The segment 85 is formed on one arm of a bell crank pivoted at 86 to a lug on the frame member 26. Pivoted to the other arm of the bell crank is one end of a link 87 pivoted at its other end to an arm 88 (Figs. 4 and 6) fastened to the universal bar 41. When any key is depressed and the universal bar moved, the link 87 will be drawn down and the bell crank rocked in a clockwise direction (Fig. 8), thereby carrying the segment 85 out of engagement with the lug 81 on the latch 77 whereupon the spring 82 will thrust the latch upward to carry the lug 78 out of the path of the arm 68 and the spring 72 will then rotate the type carrier and arms 68 until one of the arms strikes the stop 53 set by depression of the key. When the key is released, the segment 85 will be quickly returned to its first position and the portion 84 thereof will engage the lug 81 on the latch and draw it down to its normal position where its lug 78 will intercept the upper arm 68 and stop the moving parts at their normal position.

The spring 72 is kept under a more or less constant tension by the movement of the segment 85. Formed on the side of the segment 85 are teeth 91 (Figs. 5 and 6) engaging the teeth of a pinion 92 loose on the central rod 55 but rigid with a disk 93 (see also Figs. 10 and 11). The disk 93 has four holes 94 to receive the nose 95 of a pawl 96. The pawl 96 is pivotally supported on the upper face of the ratchet disk 74 with the nose 95 thereof extending through an opening 97. When the segment 85 makes its first movement, that is, in the clockwise direction (Fig. 8), the disk 93 will be driven and, because of engagement of the nose 95 with the holes 94 cause the ratchet disk 74 to be turned a corresponding distance, thereby tensioning the spring 72. The ratchet disk 74 will be retained in position by the pawl 75, while during the return stroke of the segment 85, the disk 93 will simply rotate idly back to its normal position.

Ink is applied to the type by two sets of rollers, each set containing a roller for each of the three lines of type. The construction of one of these sets is shown in Fig. 9. The rollers, designated by the numeral 101, are disks of felt or other suitable material having faces of about the same width as the type line and are mounted in small yokes 102 loose on a rod 103 supported at its upper end by a bracket 104. The lower end of the bracket 104 is attached to a member 105 which is curved to conform to the shape of the inner guide 54 and holds the lower end of the rod 103. Legs 106 formed on the member 105 provide a means for attaching the member to the frame 26. Springs 107 tend at all times to hold the ink rollers 101 against the faces of the type. Fastened to the member 105 halfway between the sets of ink rollers 101 is a stud 111 (see also Fig. 21) on which is rotatably mounted three ink receptacles or reservoirs of any desired construction, each of these reservoirs being designed to contain ink of a different color. These reservoirs supply ink to the associated rollers 101 so that a plentiful supply of ink on the rollers is at all times maintained.

As previously pointed out, the type carrier 61 has three circumferentially extending rows of type. The upper row in this particular machine is for printing dates, the middle row is for printing the name of the payee and the lower row is for printing the amount. For the purpose of taking impressions, the machine is provided with three printing hammers 112, 113 and 114 (Figs. 4, 6 and 18), one for each row of type and coöperating with each of the hammers is a plunger 115. These plungers are mounted in an extension 116 of the frame member 26 and are provided with springs to hold them in a normal position where they will not interfere with movement of the type or of the paper carriage before referred to and described in detail later on. The hammers are all rigid with trunnions 117 rotatably supported between side portions 118 of the frame extension 116. Each hammer is provided with a torsion spring wound around its trunnion. One end of each spring engages a stud 121 and the other end of each of the two lower springs engages the trunnion next above. The other end of the upper spring engages a stud 122 on a bracket 123 fastened to the frame extension. Rigid with each of the hammers is a small arm 124 provided with a stud 125 to engage the corresponding spring. The construction is such that all three hammers are held lightly in contact with their plungers but if a hammer is swung away from its plunger preparatory to striking a blow, the stud 125 will cause the associated spring to be tensioned.

For swinging the hammer away preparatory to striking a blow, each hammer has a rearwardly extending finger 126 best shown in Fig. 6 to be engaged by a nose 127 on one of three hammer operating members 128. These hammer operating members are all loosely mounted on a rod 129 and are provided with springs 130 tending to swing the arms to engage their noses 127 with the corresponding fingers 126. Mechanism described later on may be operated to hold any two of the hammer operating members in ineffective position while the third will be free to operate its hammer.

The rod 129 on which the hammer operating members are mounted is supported in the rear ends of a pair of arms 141 (Fig. 18) connected at their forward ends by a bar 142 to form a yoke. This yoke is pivoted at 143 to extensions 144 on the machine frame. Integral with the right hand arm 141 is a downwardly extending arm 145 (Figs. 4 and 6) provided with an ear 146 to be engaged by an arm 147 rigid with the universal bar 41. The construction is such that when one of the printing keys 29 is operated and the universal bar 41 depressed, the arm 147 will be swung into engagement with the ear 146 thereby swinging the rod 129 downward. This, of course, imparts a corresponding movement to all of the hammer operating members 128 and during this movement the nose 127 of the hammer operating member which is in effective condition will engage the finger 126 of the corresponding hammer and swing the hammer back against the tension of its spring 124. Near the end of this downward movement of the hammer operating members, an adjustable screw 151 in the upper end of the effective hammer operating member will act against the rear edge of the hammer arm to force nose 127 out of engagement with the finger 126. As soon as this occurs, the hammer will be released and its spring will then snap it forward against the corresponding plunger 115 to take an impression from the positioned type.

When the machine is in what may be called its normal condition, that is, the condition it is in when it has been prepared for filling in a new check blank, the hammer operating member 128 for the upper or date printing hammer 112 is effective and the other two hammer operating members will be ineffective. When the date has been written and the machine is prepared for filling in the payee's name, the hammer operating member 128 for the upper or date hammer will be disabled and the hammer operating member for the middle or payee hammer rendered effective. When the machine is prepared for filling in the amount, both the upper and middle operating connections will be disabled and the hammer operating member 128 for the amount hammer 114 rendered effective. The mechanism whereby this selective control over the hammer operation is possible will next be described.

As shown in dotted outline in Fig. 1, the name and amount keys extend rearward the same distance as the printing keys. Mounted on the shaft 43 is a small universal bar 152. The name and amount keys are provided with lugs 153 and 154, respectively, the latter being the shorter, so that operation of the keys 32 and 33 will give different extents of movement to the small universal bar 152. Rigid with the left hand arm of the small universal bar is an upwardly extending arm 155 (Fig. 6) connected by means of a twisted link 156 to an arm 157 (Fig. 1) pivoted at 158. Rigid with the arm 157 is an arm 159 engaging a lug 160 (see also Fig. 18) of a slidably mounted plate 161. A spring 162 tends at all times to hold the plate 161 in the position in which it is shown in Fig. 1, that is, with a notch 163 positioned to receive a finger 164 rigid with the date printing hammer 112. If the name key 32 is depressed, the lug 154 thereon will act through the connections just described to shift the plate 161 just far enough to carry the notch 163 in position to receive the finger 164 rigid with the payee hammer 113, while depression of the amount key will move the plate 161 still farther to render the amount printing hammer operating connection effective. While nothing of the kind is shown in the accompanying drawings, it is obvious that any of the usual latches may be employed for holding the name or amount key depressed while the line is being written.

The paper carriage has a bottom rectangular frame 166 (Figs. 6 and 15), the side members of which are suitably formed to cooperate with rollers 167 placed between them and fixed guide rails 168. Integral with the rectangular frame 166 are upwardly extending arms 171 connected at the top by a rod 172 (see also Fig. 3). The rod 172 forms a support for a guide plate 173 carrying formed flanges 174. When a check is inserted it is dropped down behind the formed flanges 174. At the time this is done either of two thumb levers 175 pivoted on the arms 171 is operated by pushing the upper end of the lever rearward. The lower end of each of the levers 175 is provided with a slot engaging a pin 176 (Figs. 2 and 20) carried by an arm 177 rigid with a shaft 178 journaled in the arms 171, the construction being such that when the thumb lever is pressed rearward, the shaft 178 will be rocked counterclockwise (Fig. 20) against the tension of a spring 179 (Fig. 3). Fastened to the shaft 178 are small arms carrying gripping pads 181 of rubber or other suitable material. It is apparent that when the shaft is rocked as just described, the gripper pads will be swung toward the front of the machine far enough to allow the paper to drop behind them until the lower edge of the paper rests upon a flange 182. The thumb lever 175 may then be released to permit the grippers to be swung into engagement with the paper.

As best shown in Fig. 1, a plate 185 and a plate 186 serve to guide the paper between the impression plungers and the type so that insertion of the paper will not be interfered with. The plate 185 may be resilient so as to serve to strip the paper from the type after the impression plunger has been withdrawn.

The paper carriage has fastened to its lower side a plate 191 (Figs. 4 and 15) having two sets of teeth, one engaging a gear 192 connected to the usual carriage motor spring 193 and the other engaging a pinion 194 forming part of the escapement mechanism. Rigid with the pinion 194 is an escapement ratchet 195. The movements of this escapement wheel are controlled by the usual flexible pawl 197 and dog 198 both carried by an arm 199 pivoted at 200. Rigid with the arm 199 is an arm 201 connected by a link 202 to an arm 203 fastened to a shaft 204 extending across the base of the machine. The arm 203 has a laterally projecting portion 205 provided with an adjustable screw 206 in the same vertical plane as a finger 207 on the arm 88, previously mentioned. When the universal bar 41 is actuated by depression of a printing key, the finger 207 will strike the screw 206 and operate the escapement in a manner well known in the art. Fastened to the shaft 204 at either side of the machine are arms 208 to be engaged by lugs 209 on the side arms supporting the space bar 34. It is clear that the space bar may be operated to actuate the escapement without disturbing the universal bar 41. If the universal bar was disturbed, whichever hammer happened to be connected would be operated.

The tabulator key 31 is connected by a link 216 (Fig. 4) to a lever 217 pivoted at 218 and the lever 217 is in turn connected by a link 221 to a bail 220 (see also Fig. 2) attached to a shaft 222 having fastened thereto a loop 223 (Fig. 16) to engage the flexible escapement pawl 197, previously mentioned, so that depression of the tabulator key results in freeing the carriage for movement by its motor spring 193. The rear end of the lever 217 is connected by a link 224 (Fig. 6) to an arm 225 (see also Figs. 2 and 7) rigid with a shaft 226 supported for both sliding and rocking movement by brackets 227 mounted on one of the guide rails 168. Fastened to the shaft 226 is a member 228 having formed thereon a shoulder 229 cooperating with a plate 230 mounted on the paper carriage. The plate 230 has two shoulders (not shown) to engage the shoulder 229. When the tabulator key 31 is depressed, it not only releases the carriage but it acts through the connections just described to rock the shaft 226 and carry the shoulder 229 in the path of one of the shoulders on the plate 230 thereby arresting the movement of the carriage in the usual way. A spring 231 on the shaft 226 acts as a bumper and also serves to carry the shoulder 229 quickly past a shoulder on the plate 230 when the tabulator key is released, thereby making possible quick successive operations of the tabulator key. The shoulders on the plate 230 are so positioned that if the tabulator key is depressed twice, the carriage will be allowed to move to correct position to start writing the date line, while if the tabulator key is depressed once, the carriage will be stopped at the correct position to begin writing the payee's name.

Operation: To operate the machine to fill in a check, one or the other of the thumb levers 175 is employed to open the paper grippers 181 and the blank check dropped down behind the flanges 174 until its lower edge rests on the flange 182 (Fig. 20) and the thumb lever released. The paper carriage may then be pushed as far to the right as it will go and the tabulator key 31 operated twice, thereby allowing the paper carriage to move the proper distance to the left for the writing to begin at the proper point to fill in the date. The writing or printing keys 29 are then operated to write the date. The paper carriage may then again be pushed as far to the right as it will go and the tabulator key operated once. This will permit the paper carriage to shift to the proper position to begin writing in the payee's name. The name key 32 is then depressed. This disables the date printing hammer in the manner previously described and renders the name printing hammer effective. The name is then written in by operation of the printing keys. The paper carriage may then again be moved to the right as far as it will go when it will be properly set for filling in the amount. The amount key is then depressed to disable both the date and name hammer mechanism and render the amount hammer mechanism effective. The amount is then written in in the usual way by operation of the printing keys 29.

While the construction herein shown and described is admirably adapted to fulfill the purposes previously stated, it is not the desire to be limited to the one embodiment as the invention is capable of various modifications and changes all coming within the scope of the claims which follow.

What is claimed is:

1. In a machine of the class described, the combination with a plurality of sets of type, of an impression member for each set and means for selectively actuating the impression members.

2. In a machine of the class described, the combination with a type carrier provided with a plurality of rows of type, of a set of writing keys, devices controlled by said keys for adjusting the type carrier to set type in each row at a printing line, an impression member for each row of type, and means for selectively connecting said impression members for operation by operation of the writing keys.

3. In a machine of the class described, the combination with a type carrier, of a plurality of printing hammers of different weights for taking impressions from the type and means for selectively operating the hammers.

4. In a machine of the class described, the combination with a type carrier having a plurality of rows of type, of a printing hammer for each type row, one of said hammers being heavier than the others and means for selectively operating the hammers.

5. In a machine of the class described, the combination with a type carrier having a plurality of rows of type, of an impression member for each row of type and means for selectively actuating the impression members according to the row of type to be printed from.

6. In a machine of the class described, the combination with a type carrier having a plurality of circumferentially extending rows of type, of a printing hammer for each row of type and means for selectively operating the hammers to print from the different rows of type.

7. In a machine of the class described, the combination with a type carrier having a plurality of circumferentially extending rows of type, of a printing hammer for each row of type, an invariably moved element and means for connecting any desired hammer to said element whereby to effect operation of the hammer.

8. In a machine of the class described, the combination with a type carrier having a plurality of circumferentially extending rows of type, of a printing hammer for each row of type, an invariably moved hammer operating member and manipulative means for connecting any desired hammer to said member whereby to effect operation of the hammer.

9. In a machine of the class described, the combination with a type carrier having a plurality of rows of type, of a printing hammer for each row of type, an invariably moved hammer operating member, independently operable hammer controlling keys, and devices actuated by said keys for connecting any desired hammer to the hammer operating member.

10. In a machine of the class described, the combination with a type carrier having rows of type thereon, the rows being spaced apart distances corresponding to distances between the lines on which the printing is to fall on the paper, of an impression member for each row of type, an invariably moved impression member operating device, independently movable devices for selectively connecting the impression members to the operating device and key actuated means for controlling the movements of said devices.

11. In a machine of the class described, the combination with a type carrier having rows of type thereon, said rows being spaced apart distances corresponding to the distances between the lines on which the printing is to fall on the paper, an impression member for each row of type, a key board common to the impression members and comprising letter and ordinal keys, and means for determining the impression member to be operated upon striking one of said keys.

12. In a machine of the class described, the combination with a type carrier having rows of type thereon, said rows being spaced apart distances corresponding to the distances between the lines on which the printing is to fall on the paper. an impression hammer for each row of type, a key board common to the impression hammers and comprising letter keys, ordinal keys and hammer controlling keys, and means actuated by the hammer controlling keys for determining the hammer to be operated upon striking a letter or ordinal key.

13. In a machine of the class described, the combination with a type carrier having circumferentially extending parallel rows of type thereon, said rows being spaced apart distances corresponding to the distances between the lines on which the printing is to fall on the paper, a printing hammer for each row of type, a key board common to the hammers and comprising letter and ordinal keys, a universal bar actuated by said keys, and means for actuating any desired hammer by movement of the universal bar.

14. In a machine of the class described, the combination with a type carrier having circumferentially extending parallel rows of type thereon, said rows being spaced apart distances corresponding to the distances between the lines on which the printing is to fall on the paper, a printing hammer for each row of type, a key board common to the hammers and comprising letter and ordinal keys, a universal bar given an invariable extent of movement by an impression of any of said keys, means for actuating any desired hammer by the movement of the universal bar and manipulative devices for determining the hammer to be actuated.

15. In a machine of the class described, the combination with a type carrier having circumferentially extending parallel rows of type thereon, said rows being spaced apart distances corresponding to the distances between the lines on which the printing is to fall on the paper, a printing hammer for each row of type, a key board common to the hammers and comprising character printing keys, a universal bar given an invariable extent of movement by operation of said keys, a member given an invariable movement by movement of the universal bar, hammer operating members carried by said invariably moved member and means for rendering any desired one of said hammer operating members effective to operate its hammer upon movement of the invariably moved member.

16. In a machine of the class described, the combination with a type carrier having circumferentially extending parallel rows of type thereon, said rows being spaced apart distances corresponding to the distances between the lines on which the printing is to fall on the paper, a printing hammer for each row of type, a differentially movable member and keys for moving same, and means controlled by said differentially movable member for operating any desired one of the hammers.

17. In a machine of the class described, the combination with a type carrier having circumferentially extending parallel rows of type thereon, said rows being spaced apart distances corresponding to the distances between the lines on which the printing is to fall on the paper, a printing hammer for each row of type, a differentially movable slide, manipulative means for setting the slide, and means controlled by the slide for selectively operating the hammers.

18. In a machine of the class described, the combination with a type carrier rotatable in a constant direction, of stops for differentially limiting said movement to determine the type to be printed from, devices comprising a keyboard for setting said stops, a spring for turning the type carrier and means actuated by operations of the keyboard for winding said spring.

19. In a machine of the class described, the combination with a type carrier rotatable in a constant direction, of stops for differentially limiting the rotation of the type carrier into engagement with the stops, a motor spring for rotating the type carrier, means for taking impressions from the type on the carrier and connections whereby operation of the impression means will tension the motor spring.

20. In a machine of the class described, the combination with a type carrier rotatable in a constant direction, of a set of stops for arresting the carrier in different positions, a key actuated cam for operating each stop to move it into and out of position to arrest the type carrier, elements moving with the type carrier and coöperating with the stops, and means operated by the key for taking an impression from the type carrier while the carrier is in arrested position.

21. In a machine of the class described, a type carrier rotatable in a constant direction, a spring for effecting the rotations of the type carrier, a set of stops independently movable into and out of position to arrest the type carrier, arms moving with the type carrier and coöperating with the stops, a key actuated cam for effecting the movements of each stop, means actuated by the key for taking an impression from the type carrier while the carrier is held stationary by a stop, and devices actuated by the key for restoring the tension to the type carrier rotating spring.

22. In a machine of the class described, a plurality of groups of type and an impression member for each group, the type of one group having their faces constructed to lacerate the paper as an incident to printing and the associated impression member having its impression face constructed to conform to the construction of the printing faces of the type, a main operating mechanism, and means for operatively connecting and disconnecting said impression member and said mechanism.

23. In a machine for writing in the variable matter on checks, drafts, and the like, a type carrier provided with a row of type for writing the dates, a row of type for writing payees' names, and a row of type for writing in the amounts, a keyboard, means controlled by said keyboard for adjusting the type carrier to set type in each row at a printing position, an impression member for each row of type, and means comprising manipulative devices for selectively connecting the impression devices for operation by operations of the keyboard.

HERBERT H. STEELE.